United States Patent
Watanabe et al.

(10) Patent No.: US 11,912,344 B2
(45) Date of Patent: Feb. 27, 2024

(54) VEHICLE LOWER PART STRUCTURE

(71) Applicant: TOYOTA JIDOSHA KABUSHIKI KAISHA, Aichi-ken (JP)

(72) Inventors: Jumpei Watanabe, Nagakute (JP); Yasuhiro Hara, Nagoya (JP); Norimasa Koreishi, Miyoshi (JP); Hirotaka Ishioka, Toyota (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 32 days.

(21) Appl. No.: 17/086,457

(22) Filed: Nov. 2, 2020

(65) Prior Publication Data
US 2021/0129916 A1    May 6, 2021

(30) Foreign Application Priority Data
Nov. 5, 2019  (JP) .................. 2019-200969

(51) Int. Cl.
*B62D 25/20*    (2006.01)
*B62D 27/02*    (2006.01)
(Continued)

(52) U.S. Cl.
CPC ......... *B62D 25/2009* (2013.01); *B62D 21/02* (2013.01); *B62D 27/023* (2013.01);
(Continued)

(58) Field of Classification Search
CPC .. B62D 25/2009; B62D 21/02; B62D 27/023; B62D 21/09; B62D 25/20; B62D 21/152
(Continued)

(56) References Cited

U.S. PATENT DOCUMENTS 5,718,048 A * 2/1998 Horton ............... B21D 5/08
                                              72/58
6,428,046 B1   8/2002 Kocer et al.
(Continued)

FOREIGN PATENT DOCUMENTS

DE   112010005284 T5   12/2012
EP      2695798 B1     12/2016
(Continued)

OTHER PUBLICATIONS

Unpublished U.S. Appl. No. 16/850,595, filed Apr. 16, 2020, 40pp.

*Primary Examiner* — Amy R Weisberg
*Assistant Examiner* — Dana D Ivey
(74) *Attorney, Agent, or Firm* — HAUPTMAN HAM, LLP

(57) ABSTRACT

A vehicle lower part structure includes: center rail portions disposed at a central part in a front-rear direction of the vehicle; front rail portions disposed forward of the center rail portions in the front-rear direction of the vehicle; rear rail portions disposed rearward of the center rail portions in the front-rear direction of the vehicle; front connecting rail portions connecting the center rail portions and the front rail portions in the front-rear direction of the vehicle; rear connecting rail portions connecting the center rail portions and the rear rail portions in the front-rear direction of the vehicle; first mount portions supporting a vehicle body constituting a cabin; and second mount portions supporting the vehicle body.

11 Claims, 4 Drawing Sheets

(51) Int. Cl.
   *B62D 21/02* (2006.01)
   *B62D 21/09* (2006.01)
   *B62D 21/15* (2006.01)

(52) U.S. Cl.
   CPC ............ *B62D 21/09* (2013.01); *B62D 21/152* (2013.01); *B62D 25/20* (2013.01)

(58) Field of Classification Search
   USPC .................................................... 296/187.08
   See application file for complete search history.

(56) References Cited

U.S. PATENT DOCUMENTS

| | | | |
|---|---|---|---|
| 7,370,886 B2* | 5/2008 | Luttinen | B60G 7/003 |
| | | | 296/205 |
| 8,636,314 B2* | 1/2014 | Mildner | B62D 21/02 |
| | | | 296/204 |
| 2009/0058065 A1 | 3/2009 | Park | |
| 2012/0313360 A1 | 12/2012 | Akaki et al. | |
| 2013/0119706 A1 | 5/2013 | Katayama et al. | |
| 2017/0001667 A1* | 1/2017 | Ashraf | B60K 1/00 |
| 2017/0217296 A1 | 8/2017 | Nomura et al. | |

FOREIGN PATENT DOCUMENTS

| | | |
|---|---|---|
| JP | H297375 A | 10/1992 |
| JP | H5272590 A | 10/1993 |
| JP | 2009196438 A | 9/2009 |
| JP | 2013105615 A | 5/2013 |
| JP | 201415166 A | 1/2014 |

\* cited by examiner

VEHICLE LOWER PART STRUCTURE

INCORPORATION BY REFERENCE

The disclosure of Japanese Patent Application No. 2019-200969 filed on Nov. 5, 2019 including the specification, drawings and abstract is incorporated herein by reference in its entirety.

BACKGROUND

1. Technical Field

The disclosure relates to a vehicle lower part structure.

2. Description of Related Art

Japanese Unexamined Patent Application Publication No. 2013-105615 (JP 2013-105615 A) discloses a vehicle body frame for an electric vehicle, which includes floor frames disposed at the central part of the vehicle in the front-rear direction, front side frames disposed at the front part of the vehicle, and rear side frames disposed at the rear part of the vehicle. The front side frames and the rear side frames are disposed upward of the floor frames in the vehicle up-down direction.

SUMMARY

In the vehicle body frame described in JP 2013-105615 A, a wide cabin can be secured by setting the floor frames (center rail portions) located at the central part of the vehicle in the front-rear direction to be long in the front-rear direction. However, when the floor frames are set to be long, the inclination angle of the connecting portions between the floor frames and the front side frames becomes large, so it is difficult to suppress deformation of the vehicle body frame at the time of a frontal collision of the vehicle (hereinafter, also referred to as "at the time of frontal collision"). Similarly, when the inclination angle of the connecting portions between the floor frames and the rear side frames becomes large, it is difficult to suppress deformation of the vehicle body frame at the time of a rear-end collision of the vehicle (hereinafter, also referred to as "at the time of rear-end collision"). As described above, the related art has room for improvement from the viewpoint of improving the collision safety performance of the vehicle.

The disclosure provides a vehicle lower part structure that allows improvement of the collision safety performance while securing a space in the vehicle cabin.

A vehicle lower part structure according to an aspect of the disclosure includes: a pair of right and left center rail portions disposed at a central part in a front-rear direction of a vehicle and extending in the front-rear direction of the vehicle; a pair of right and left front rail portions and a pair of right and left rear rail portions, the front rail portions being disposed forward of the center rail portions in the front-rear direction of the vehicle, the rear rail portions being disposed rearward of the center rail portions in the front-rear direction of the vehicle, and the front rail portions and the rear rail portions each extending in the front-rear direction of the vehicle at a position upward of the center rail portions in an up-down direction of the vehicle; a pair of right and left front connecting rail portions and a pair of right and left rear connecting rail portions, the front connecting rail portions connecting the center rail portions and the front rail portions, the rear connecting rail portions connecting the center rail portions and the rear rail portions, and the front connecting rail portions and the rear connecting rail portions being inclined upward in the up-down direction of the vehicle from the center rail portions toward the front rail portions and the rear rail portions, respectively, as viewed in a width direction of the vehicle; first mount portions that are provided at at least one of a connecting portion between the center rail portions and the front connecting rail portions and a connecting portion between the center rail portions and the rear connecting rail portions, the first mount portions supporting a vehicle body constituting a cabin; and second mount portions that are provided at at least one of a connecting portion between the front rail portions and the front connecting rail portions and a connecting portion between the rear rail portions and the rear connecting rail portions, the second mount portions supporting the vehicle body.

According to the above aspect, the center rail portions are disposed at the central part in the front-rear direction of the vehicle, and each of the center rail portions extends in the front-rear direction of the vehicle. Further, the front rail portions and the rear rail portions are disposed forward and rearward, respectively, of the center rail portions in the front-rear direction of the vehicle. The front rail portions and the rear rail portions are positioned upward of the center rail portions in the up-down direction of the vehicle and extend in the front-rear direction of the vehicle. Furthermore, the center rail portions and the front rail portions are connected through the front connecting rail portions, and the center rail portions and the rear rail portions are connected through the rear connecting rail portions. The front connecting rail portions and the rear connecting rail portions are inclined upward in the up-down direction of the vehicle, from the center rail portions toward the front rail portions and the rear rail portions, respectively, as viewed in the width direction of the vehicle. The center rail portions, the front rail portions, the rear rail portions, the front connecting rail portions, and the rear connecting rail portions constituted a frame. Thus, the connecting portions between the center rail portions and the connecting rail portions, the connecting portions between the front rail portions and the front connecting rail portions, and the connecting portions between the rear rail portions and the rear connecting rail portions of the frame are bent or curved.

The first mount portions that support the vehicle body constituting the cabin are provided at a connecting portion between the center rail portions and the front connecting rail portions and/or at a connecting portion between the center rail portions and the rear connecting rail portions. The second mount portions that support the vehicle body are provided at a connecting portion between the front rail portions and the front connecting rail portions and/or at a connecting portion between the rear rail portions and the rear connecting rail portions. Thus, a load (self weight) from the vehicle body acts downward in the vertical direction on each of the connecting portions. As a result, even when a collision load is input to the frame, it is possible to suppress the frame from deforming starting from the connecting portion between the front rail portions and/or the front connecting rail portions or the connecting portion between the rear rail portions and the rear connecting rail portions. That is, even when the inclination angle of the connecting rail portions is increased to secure the space in the vehicle cabin, it is possible to suppress the frame from deforming at the time of collision of the vehicle.

In the above aspect, the first mount portions and the second mount portions may be provided at each of a front part and a rear part of the vehicle.

According to the above configuration, the first mount portions and the second mount portions are provided at the front part and the rear part of the vehicle. Thus, it is possible to suppress the frame from deforming in both the cases of frontal collision and rear-end collision of the vehicle.

In the above aspect, the first mount portions may support lower end portions of pillars extending in the up-down direction of the vehicle at side portions of the vehicle body and constituting a frame.

According to the above configuration, the first mount portions support the lower end portions of the pillars extending in the up-down direction of the vehicle at the side portions of the vehicle body and constituting the frame of the vehicle body. This allows the pillars to bear a part of the collision load that acts on the first mount portions.

In the above aspect, the first mount portions each may be configured to include a first mount bracket to which the vehicle body is fastened. The second mount portions each may be configured to include a second mount bracket to which the vehicle body is fastened.

According to the above configuration, the vehicle body can be supported by the first mount portions and the second mount portions only by fastening the vehicle body to the first mount bracket and the second mount bracket.

In the above aspect, a first protruding member and a second protruding member may be disposed at lower portions of the vehicle body so as to be spaced apart from each other in the front-rear direction of the vehicle, the first protruding member and the second protruding member extending in the width direction of the vehicle and protruding downward in the up-down direction of the vehicle. The first protruding member may be fastened to pairs of the right and left first mount brackets. The second protruding member may be fastened to the right and left second mount brackets.

According to the above configuration, the first protruding member and the second protruding member protrude downward in the up-down direction of the vehicle from the lower portion of the vehicle body, and the first protruding member is fastened to the right and left first mount brackets. Further, the second protruding member is fastened to the right and left second mount brackets. Thus, the collision load input to the frame is dispersed to the right and left via the first protruding member and the second protruding member.

In the above aspect, a third mount portion that supports the vehicle body may be provided forward, in the front-rear direction of the vehicle, of each of the second mount portions at the front part of the vehicle.

In the above aspect, a third mount portion that supports the vehicle body may be provided rearward, in the front-rear direction of the vehicle, of each of the second mount portions at the rear part of the vehicle.

According to the above configuration, the load in the vertical direction from the vehicle body acts on the front rail portions or the rear rail portions, at two locations, namely, at the second mount portions and the third mount portions. Thus, it is possible to effectively suppress the front rail portions and the rear rail portions from deforming upward at the time of frontal collision and rear-end collision, respectively, of the vehicle.

In the above aspect, the vehicle lower part structure may further include a connecting member connecting the right and left front rail portions in the width direction of the vehicle. At least a part of the third mount portion may be located upward, in the up-down direction of the vehicle, of a joint portion between each of the front rail portions and the connecting member as viewed in the width direction of the vehicle.

In the above aspect, the vehicle lower part structure may further include a connecting member connecting the right and left rear rail portions in the width direction of the vehicle. At least a part of the third mount portion may be located upward, in the up-down direction of the vehicle, of a joint portion between each of the rear rail portions and the connecting member as viewed in the width direction of the vehicle.

According to the above configuration, at least a part of the third mount portion supporting the vehicle body is located upward, in the up-down direction of the vehicle, of the joint portion between each of the front rail portions and the connecting member or the joint portion between each of the rear rail portions and the connecting member as viewed in the width direction of the vehicle. Thus, compared to a structure in which the third mount portion and the connecting member are arranged offset from each other in the front-rear direction of the vehicle, a large crushing margin of the front rail portions or the rear rail portions can be secured at the time of frontal collision or rear-end collision. That is, in the structure in which the third mount portion and the connecting member are arranged offset from each other in the front-rear direction of the vehicle, the joint portion at which the part of the third mount portion and the connecting member are joined is not crushed when the collision load is input to front rail portions or the rear rail portions. In contrast, in a structure in which at least a part of the third mount portion is located upward, in the up-down direction of the vehicle, of the joint portion between the front rail portions and the connecting member or the joint portion between the rear rail portions and the connecting member as viewed in the width direction of the vehicle, it is possible to secure further crushing margin corresponding to the portion where the third mount portion and the joint portion overlap in the front-rear direction of the vehicle as viewed in the vehicle width direction. As a result, the collision energy at the time of frontal collision or rear-end collision can be effectively absorbed.

As described above, with the vehicle lower part structure of the disclosure, it is possible to improve the collision safety performance while securing the space in the vehicle cabin.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle lower part structure according to an embodiment will be described with reference to the drawings. An arrow FR, an arrow UP, and an arrow RH that are appropriately shown in each drawing indicate a forward direction, an upward direction, and a rightward direction, respectively, of a vehicle. Hereinafter, when the description is made simply using terms indicating directions i.e., forward and rearward, upward and downward, and right and left, these means forward and rearward in the vehicle front-rear direction, upward and downward in the vehicle up-down direction, and right and left as seen in the direction facing forward.

Overall Structure of Frame 12

Figure 1:
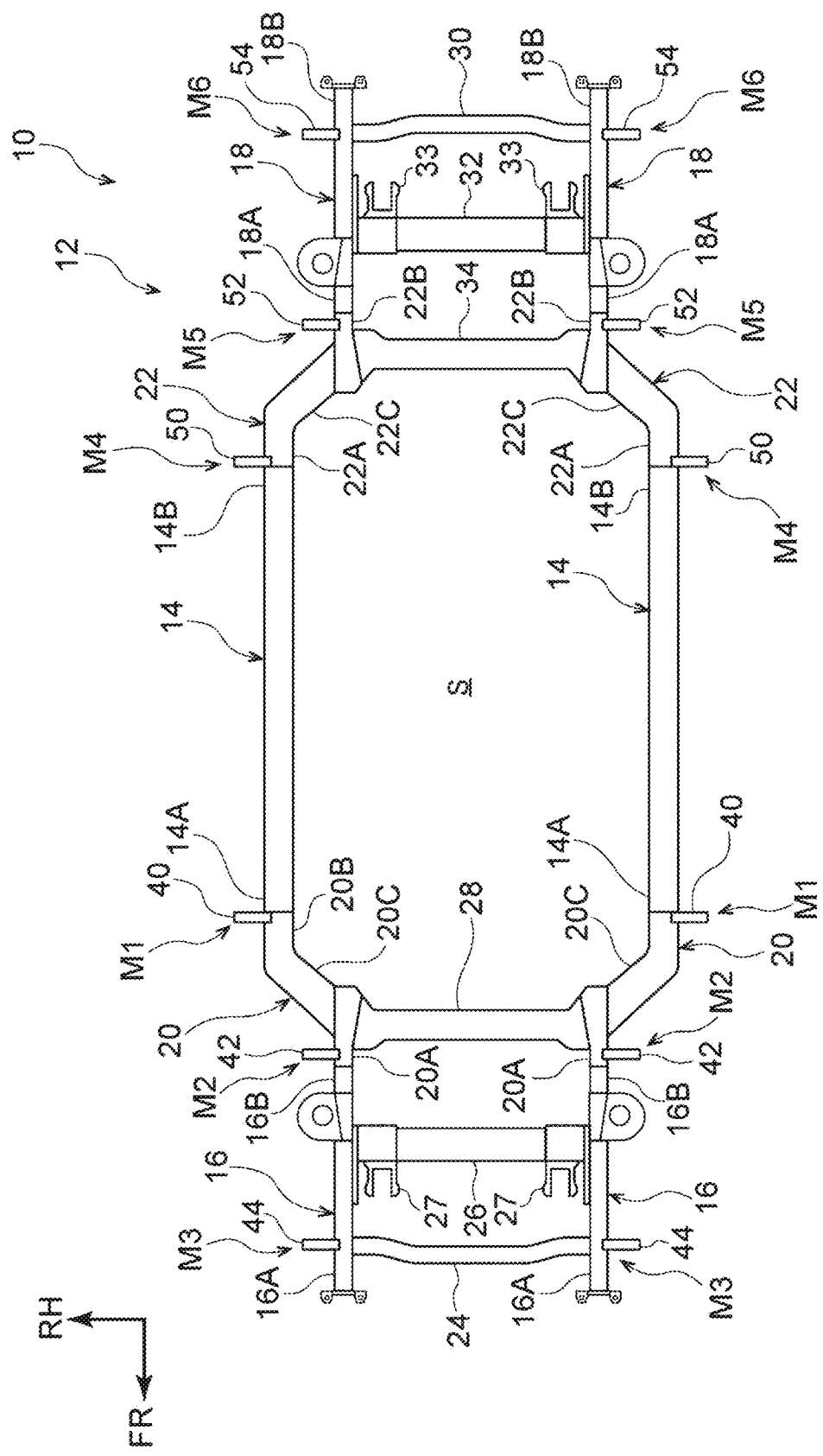
FIG. 1 is a plan view showing a frame of a vehicle to which a vehicle lower part structure according to an embodiment is applied.

As shown in FIG. 1, a vehicle 10 to which the vehicle lower part structure according to the present embodiment is applied is a so-called frame type vehicle in which a vehicle body 60 (see FIG. 2) is supported on a frame 12. The frame 12 of the vehicle 10 includes center rail portions 14, front rail portions 16 serving as front-rear rail portions, rear rail portions 18 serving as the front-rear rail portions, front connecting rail portions 20, and rear connecting rail portions 22. The vehicle 10 of the present embodiment has, for example, a symmetrical structure in the front-rear direction, and is a vehicle that can travel both forward and backward. Therefore, in the following description, one side in the traveling direction of the vehicle is referred to as a vehicle front side for convenience, and the other side in the traveling direction is referred to as a vehicle rear side for convenience.

The center rail portions 14 are disposed at the central part in the vehicle front-rear direction, and are provided in a right and left pair. Each of the center rail portions 14 extends in the vehicle front-rear direction and has a closed cross-section structure. Note that the vehicle 10 of the present embodiment is, as an example, an electric vehicle that uses a motor (not shown) as a drive source, and a battery (not shown) that supplies electric power to the motor is mounted in a space S between the center rail portions 14. Thus, the center rail portions 14 are disposed so as to sandwich the battery, and the battery is supported by the center rail portions 14.

The front rail portions 16 each having a closed cross-section structure are disposed forward of the center rail portions 14 in the vehicle front-rear direction so as to be spaced apart from the center rail portions 14. The front rail portions 16 are disposed inward of the center rail portions 14 in the vehicle width direction, and are provided in a right and left pair like the center rail portions 14. Further, each of the front rail portions 16 extends in the vehicle front-rear direction, and a bumper reinforcement (not shown) is attached to front portions 16A of the front rail portions 16.

Figure 4:
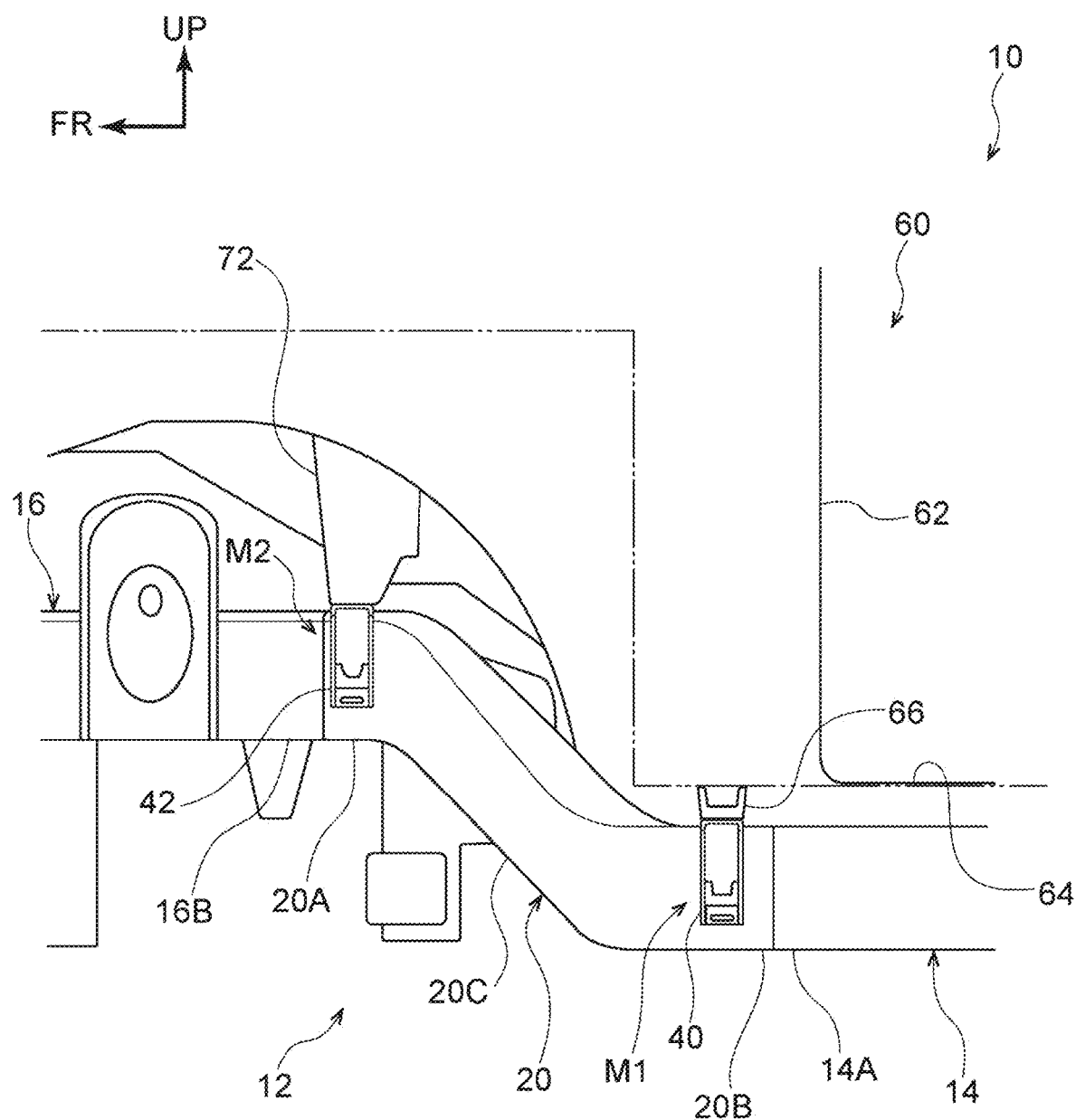
FIG. 4 is a side view of the main part of the vehicle according to the embodiment as viewed from the left side of the vehicle.

Further, as shown in FIG. 4, the front rail portions 16 are located upward of the center rail portions 14 in the vehicle up-down direction, and the center rail portions 14 and the front rail portions 16 are connected to each other in the vehicle front-rear direction through the front connecting rail portions 20.

The front connecting rail portions 20 are inclined upward, in the vehicle up-down direction, from the center rail portions 14 toward the front rail portions 16 as viewed in the vehicle width direction. Specifically, front portions 20A of the front connecting rail portions 20 extend in the vehicle front-rear direction at substantially the same height as rear portions 16B of the front rail portions 16. Rear portions 20B of the front connecting rail portions 20 extend in the vehicle front-rear direction at substantially the same height as the front portions 14A of the center rail portions 14. Inclined portions 20C are provided between the front portions 20A and the rear portions 20B in the front connecting rail portions 20. The inclined portions 20C are inclined upward in the vehicle up-down direction and extend inward in the vehicle width direction, from the rear portions 20B toward the front portions 20A. Here, first front mount portions M1 are set on the rear portions 20B of the front connecting rail portions 20, and second front mount portions M2 are set on the front portions 20A of the front connecting rail portions 20. Further, as shown in FIG. 1, third front mount portions M3 are set on the front portions 16A of the front rail portions 16. The first front mount portions M1, the second front mount portions M2, and the third front mount portions M3 will be described later in detail.

The rear rail portions 18 each having a closed cross-section structure are disposed rearward of the center rail portions 14 in the vehicle front-rear direction so as to be spaced apart from the center rail portions 14. The rear rail portions 18 are disposed inward of the center rail portions 14 in the vehicle width direction, and are provided in a right and left pair like the center rail portions 14. Further, each of the rear rail portions 18 extends in the vehicle front-rear direction, and a bumper reinforcement (not shown) is attached to rear portions 18B of the rear rail portions 18. Here, the rear rail portions 18 and the front rail portions 16 have a symmetrical structure in the front-rear direction.

The rear rail portions 18 are located upward of the center rail portions 14 in the vehicle up-down direction, and the center rail portions 14 and the rear rail portions 18 are connected to each other in the vehicle front-rear direction through the rear connecting rail portions 22.

The rear connecting rail portions 22 are inclined upward, in the vehicle up-down direction, from the center rail portions 14 toward the rear rail portions 18 as viewed in the vehicle width direction. Specifically, front portions 22A of the rear connecting rail portions 22 extend in the vehicle front-rear direction at substantially the same height as rear portions 14B of the center rail portions 14. Further, rear portions 22B of the rear connecting rail portions 22 extend in the vehicle front-rear direction at substantially the same height as front portions 18A of the rear rail portions 18. Inclined portions 22C are provided between the front portions 22A and the rear portions 22B in the rear connecting rail portions 22. The inclined portions 22C are inclined upward in the vehicle up-down direction and extend inward in the vehicle width direction, from the front portions 22A toward the rear portions 22B. Here, first rear mount portions M4 are set on the front portions 22A of the rear connecting rail portions 22, and second rear mount portions M5 are set on the rear portions 22B of the rear connecting rail portions 22. Third rear mount portions M6 are set on the rear portions 18B of the rear rail portions 18. The first rear mount portions M4, the second rear mount portions M5, and the third rear mount portions M6 will be described later in detail.

Here, a first front cross member 24, a second front cross member 26, and a third front cross member 28 extending in the vehicle width direction are provided at the front part of the frame 12. Further, a first rear cross member 30, a second rear cross member 32, and a third rear cross member 34 extending in the vehicle width direction are provided at the rear part of the frame 12.

Figure 3:
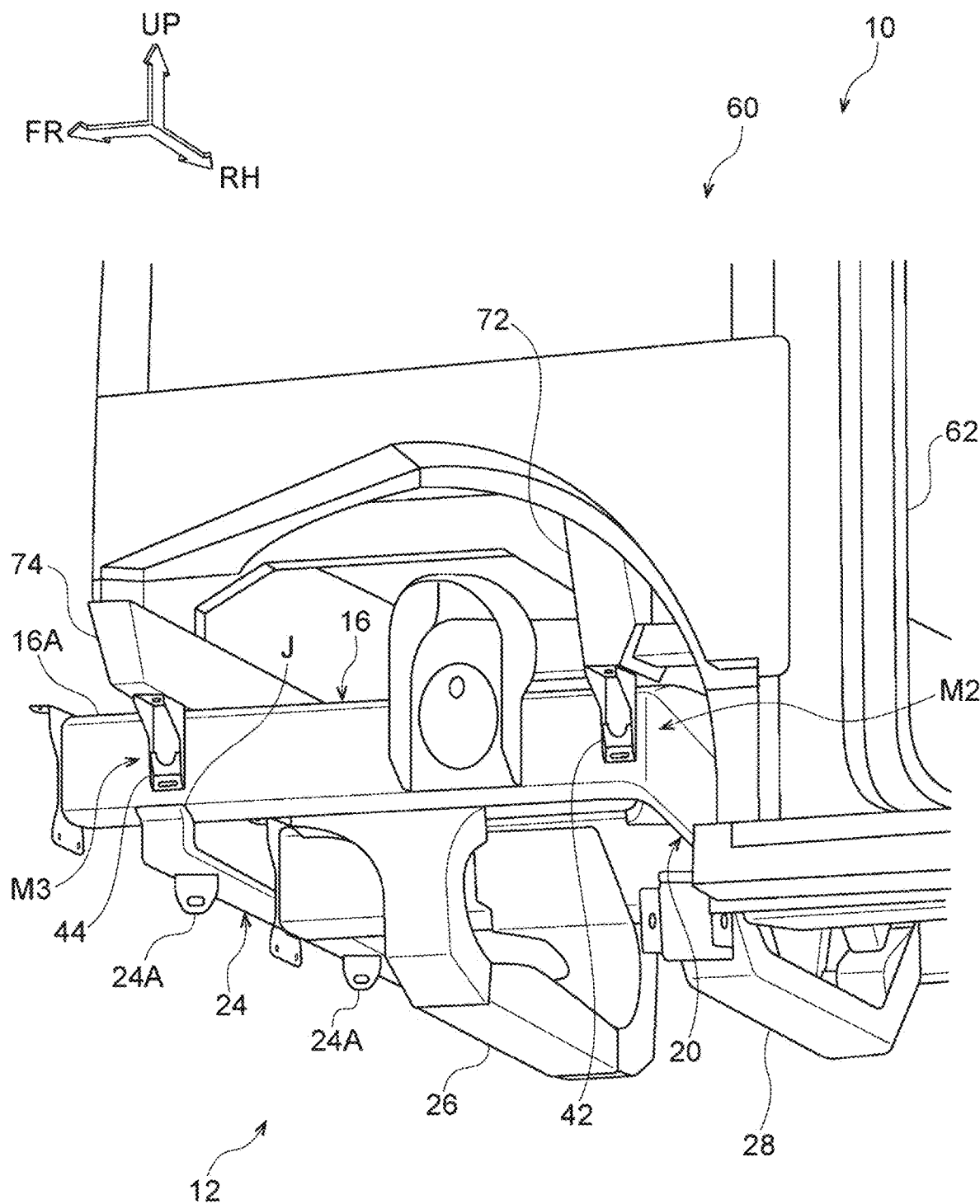
FIG. 3 is a perspective view of a main part of the vehicle to which the vehicle lower part structure according to the embodiment is applied, as viewed from the left side of the vehicle.

As shown in FIG. 3, the first front cross member 24 is located at the front part of the front rail portions 16 and can be regarded as the "connecting member" of the disclosure. The first front cross member 24 connects the lower surfaces of the front rail portions 16 to each other in the vehicle width direction, and each of the front rail portions 16 and the first front cross member 24 are joined at a joint portion J. A pair of right and left hook attachment portions 24A is provided on the lower surface of the first front cross member 24, and hooks for towing can be attached to the hook attachment portions 24A.

The first front cross member 24 of the present embodiment is a radiator support lower member that supports a radiator (not shown) from below. Thus, a radiator support upper member (not shown) is provided upward of the first front cross member 24 in the vehicle up-down direction, and the radiator is held between the radiator support upper member and the first front cross member 24 from above and below.

The second front cross member 26 is provided rearward of the first front cross member 24, and the second front cross member 26 connects the lower surfaces of the front rail portions 16 in the vehicle width direction. Further, as shown in FIG. 1, the second front cross member 26 is provided with a pair of right and left motor mount attachment portions 27, and a motor mount (not shown) is attached to the motor mount attachment portions 27.

As shown in FIG. 3, the third front cross member 28 is provided rearward of the second front cross member 26, and the third front cross member 28 connects the front connecting rail portions 20 to each other in the vehicle width direction.

On the other hand, as shown in FIG. 1, the first rear cross member 30 is located at the rear part of the rear rail portions 18, and the first rear cross member 30 connects the lower surfaces of the rear rail portions 18 in the vehicle width direction.

The second rear cross member 32 is provided forward of the first rear cross member 30, and the second rear cross member 32 connects the lower surfaces of the rear rail portions 18 in the vehicle width direction. Further, as shown in FIG. 1, the second rear cross member 32 is provided with a pair of right and left motor mount attachment portions 33.

The third rear cross member 34 is provided forward of the second rear cross member 32, and the third rear cross member 34 connects the rear connecting rail portions 22 to each other in the vehicle width direction.

Vehicle Body

Figure 2:
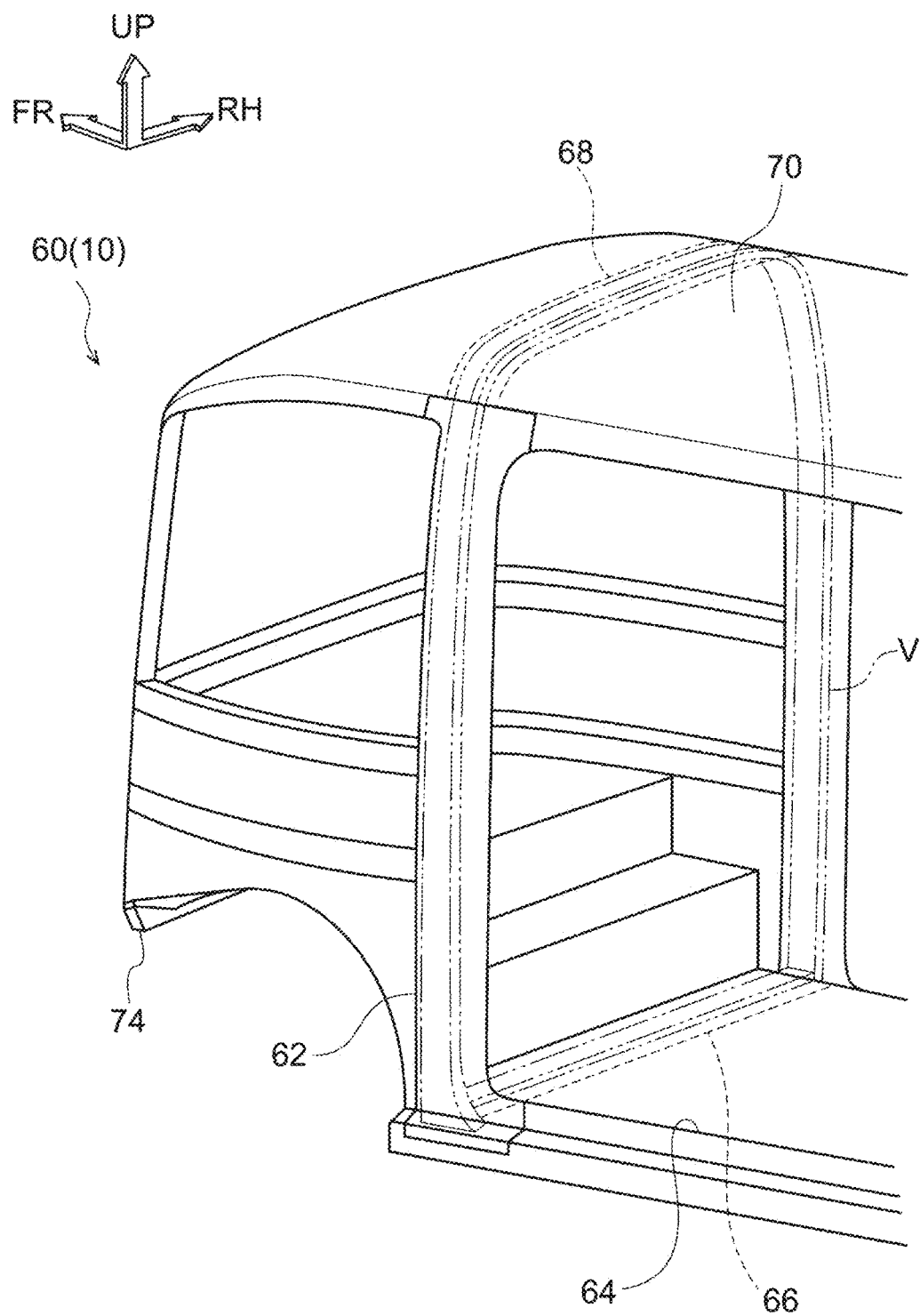
FIG. 2 is a perspective view showing a main part of a vehicle body in the embodiment.

Next, the vehicle body 60 supported on the frame 12 will be described. As shown in FIG. 2, the vehicle body 60 has a generally box shape, and the vehicle body 60 constitutes a cabin. Pillars 62 extending in the vehicle up-down direction are provided at the front part of the vehicle body 60.

The pillars 62 each have a closed cross-section structure obtained by stacking steel plates, and are provided in a right and left pair. Door openings 64 are located rearward of the pillars 62 in the vehicle front-rear direction. Further, a space in which the driver's seat is provided is located forward of the pillars 62 in the vehicle front-rear direction and disposed at a relatively high position.

The lower end portions of the pillars 62 are connected to each other in the vehicle width direction by a first protruding member 66. The first protruding member 66 protrudes downward from the lower portion of the vehicle body 60 and extends in the vehicle width direction. The lower end portion of the left pillar 62 and the lower end portion of the right pillar 62 are connected by the first protruding member 66.

Further, the upper end portions of the pillars 62 are connected to each other in the vehicle width direction by a roof reinforcement 68. The roof reinforcement 68 is provided at the upper part of the vehicle body 60 to reinforce a roof 70, and connects the upper end portion of the left pillar 62 and the upper end portion of the right pillar 62. Therefore, the right and left pillars 62, the first protruding member 66, and the roof reinforcement 68 constitute a generally annular reinforcing structure V.

As shown in FIG. 4, a second protruding member 72 is provided forward of the first protruding member 66 in the vehicle front-rear direction. The second protruding member 72 protrudes downward from the lower surface of the vehicle body 60 and extends in the vehicle width direction. Further, as shown in FIGS. 2 and 3, a third protruding member 74 is provided on the lower surface of the front end portion of the vehicle body 60. The third protruding member 74 protrudes downward from the lower surface of the front end of the vehicle 10 and extends in the vehicle width direction.

Although not shown, the vehicle body 60 of the present embodiment has a symmetrical shape in the front-rear direction. Thus, a reinforcing structure similar to the reinforcing structure V is provided at the rear part of the vehicle body 60. Further, protruding members similar to the second protruding member 72 and the third protruding member 74 are provided on the lower surface of the vehicle body 60 so as to be spaced apart from each other in the vehicle front-rear direction.

Front Mount Portions

Here, as shown in FIG. 1, at the front part of the frame 12 in the vehicle front-rear direction, the first front mount portions M1, the second front mount portions M2, and the third front mount portions M3 that support the front part of the vehicle body 60 are provided. The first front mount portions M1 are provided in a right and left pair, the second front mount portions M2 are provided in a right and left pair, and the third front mount portions M3 are provided in a right and left pair.

As shown in FIG. 4, the first front mount portions M1 are provided at the connecting portions between the right and left center rail portions 14 and the front connecting rail portions 20. The first front mount portions M1 of the present embodiment are set to portions including the front portions 14A of the center rail portions 14 and the rear portions 20B of the front connecting rail portions 20. The vehicle body 60 is supported by the first front mount portions M1. Specifically, the first front mount portions M1 each include a first front mount bracket 40 to which the vehicle body 60 is fastened. In the present embodiment, as an example, the first front mount brackets 40 are provided on the rear portions 20B of the front connecting rail portions 20.

The right and left first front mount brackets 40 are attached to side walls of the rear portions 20B on the outer sides in the vehicle width direction. Further, since the first front mount brackets 40 protrude along the side walls of the rear portions 20B to slightly above the rear portions 20B and extend outward in the vehicle width direction from the upper end portions, the first front mount brackets 40 each have a generally L shape as viewed in the vehicle front-rear direction. The lower surface of the first protruding member 66 is fastened to the right and left first front mount brackets 40. That is, the lower end portions of the pillars 62 constituting a frame of the vehicle body 60 are supported by the first front mount portions M1.

The second front mount portions M2 are provided forward of the first front mount portions M1 in the vehicle front-rear direction. The second front mount portions M2 are provided at the connecting portions between the right and left front rail portions 16 and the front connecting rail portions 20, and the second front mount portions M2 of the present embodiment are set to portions including the rear portions 16B of the front rail portions 16 and the front portions 20A of the front connecting rail portions 20. The vehicle body 60 is supported by the second front mount portions M2. Specifically, the second front mount portions M2 each include a second front mount bracket 42 to which the vehicle body 60 is fastened. In the present embodiment, as an example, the second front mount brackets 42 are provided on the front portions 20A of the front connecting rail portions 20.

The right and left second front mount brackets 42 are attached to side walls of the front portions 20A on the outer sides in the vehicle width direction. Further, since the second front mount brackets 42 protrude along the side walls of the front portions 20A to slightly above the front portions 20A and extend outward in the vehicle width direction from the upper end portions, the second front mount brackets 42 each have a generally L shape as viewed in the vehicle front-rear direction. The lower surface of the second protruding member 72 is fastened to the right and left second front mount brackets 42.

As shown in FIG. 3, the third front mount portions M3 are provided forward of the second front mount portions M2 in the vehicle front-rear direction. The third front mount portions M3 are provided on the front portions 16A of the right and left front rail portions 16, and the front end portion of the vehicle body 60 is supported by the third front mount portions M3. Specifically, the third front mount portions M3 each include a third front mount bracket 44 to which the vehicle body 60 is fastened. In the present embodiment, as an example, the third front mount brackets 44 are provided above the first front cross member 24 as viewed in the vehicle width direction.

The right and left third front mount brackets 44 are attached to side walls of the front rail portions 16 on the outer sides in the vehicle width direction. Further, since the third front mount brackets 44 protrude along the side walls of the front rail portions 16 to slightly above the front rail portions 16 and extend outward in the vehicle width direction from the upper end portions, the third front mount brackets 44 each have a generally L shape as viewed in the vehicle front-rear direction. The lower surface of the third protruding member 74 is fastened to the right and left third front mount brackets 44. Thus, at least parts of the third front mount portions M3 are located upward of the joint portions J between the front rail portions 16 and the first front cross member 24 in the vehicle up-down direction, as viewed in the vehicle width direction.

Rear Mount Portions

As shown in FIG. 1, at the rear part of the frame 12, the first rear mount portions M4, the second rear mount portions M5, and the third rear mount portions M6 that support the rear part of the vehicle body 60 are provided. The first rear mount portions M4 are provided in a right and left pair, the second rear mount portions M5 are provided in a right and left pair, and the third rear mount portions M6 are provided in a right and left pair.

The first rear mount portions M4 have the same structures as the first front mount portions M1. That is, the first rear mount portions M4 are provided on the connecting portions between the right and left center rail portions 14 and the rear connecting rail portions 22, and each include a first rear mount bracket 50 to which the vehicle body 60 is fastened. In the present embodiment, as an example, the first rear mount brackets 50 are provided on the front portions 22A of the rear connecting rail portions 22. The first rear mount portions M4 support the lower end portions of pillars (not shown) that constitute the frame of the vehicle body 60.

The second rear mount portions M5 are provided rearward of the first rear mount portions M4 in the vehicle front-rear direction. The second rear mount portions M5 are provided at the connecting portions between the right and left rear rail portions 18 and the rear connecting rail portions 22, and each include a second rear mount bracket 52 to which the vehicle body 60 is fastened. In the present embodiment, as an example, the second rear mount brackets 52 are provided on the rear portions 22B of the rear connecting rail portions 22.

The third rear mount portions M6 are provided rearward of the second rear mount portions M5 in the vehicle front-rear direction. The third rear mount portions M6 are provided on the rear portions 18B of the right and left rear rail portions 18 and each include a third rear mount bracket 54 to which the vehicle body 60 is fastened. In the present embodiment, as an example, the third rear mount brackets 54 are provided above the first rear cross member 30.

Operations

Next, operations of the present embodiment will be described.

In the frame 12 of the vehicle 10 to which the vehicle lower part structure of the present embodiment is applied, the center rail portions 14 and the front rail portions 16 are connected to each other in the vehicle front-rear direction through the front connecting rail portions 20. Further, the center rail portions 14 and the rear rail portions 18 are connected to each other in the vehicle front-rear direction through the rear connecting rail portions 22. Further, as shown in FIG. 4, the front connecting rail portions 20 are inclined upward in the vehicle up-down direction, from the center rail portions 14 toward the front rail portions 16 as viewed in the vehicle width direction. Therefore, the connecting portions between the center rail portions 14 and the front connecting rail portions 20 and the connecting portions between the front rail portions 16 and the front connecting rail portions 20 are bent or curved. Here, the rear rail portions 18 and the rear connecting rail portions 22 have a symmetrical structure with the front rail portions 16 and the front connecting rail portions 20 in the vehicle front-rear direction. Therefore, although not shown, the connecting portions between the center rail portions 14 and the rear connecting rail portions 22 and the connecting portions between the rear rail portions 18 and the rear connecting rail portions 22 are bent or curved.

In the vehicle 10 including the frame 12 configured as described above, in the present embodiment, the connecting portions between the center rail portions 14 and the front connecting rail portions 20 are provided with the first front mount portions M1 on which the vehicle body 60 is supported. Further, the connecting portions between the front rail portions 16 and the front connecting rail portions 20 are provided with the second front mount portions M2 that support the vehicle body 60. Accordingly, a load (self weight) from the vehicle body 60 acts downward in the vertical direction on each of the first front mount portions M1 and the second front mount portions M2. As a result, it is possible to suppress the front part of the frame 12 (that is, the front rail portions 16) from deforming upward starting from the connecting portions between the front rail portions 16 and the front connecting rail portions 20. In particular, when the inclination angle of the front connecting rail portions 20 is increased, the frame 12 is likely to deform into a generally Z shape as viewed in the vehicle width direction. However, since the load (self weight) from the vehicle body 60 acts downward in the vertical direction on the frame 12, it is possible to suppress the frame 12 from deforming into a generally Z shape.

Further, as shown in FIG. 1, in the present embodiment, the connecting portions between the center rail portions 14 and the rear connecting rail portions 22 are provided with the first rear mount portions M4 that support the vehicle body 60. Further, the connecting portions between the rear rail portions 18 and the rear connecting rail portions 22 are provided with the second rear mount portions M5 that support the vehicle body 60. That is, the first mount portions and the second mount portions are provided at the front and the rear, and the load (self weight) from the vehicle body 60 acts downward in the vertical direction on each of the first mount portions and the second mount portions. Thus, it is possible to suppress the frame 12 from deforming in both the cases of frontal collision and rear-end collision of the vehicle 10. As a result, the vehicle 10 according to the present embodiment can improve the collision safety performance while securing the space in the vehicle cabin.

Furthermore, in the present embodiment, as shown in FIG. 4, the lower end portions of the pillars 62 are supported by the first front mount portions M1. This allows the pillars 62 to bear a part of the collision load acting on the first front mount portions M1. Especially in the present embodiment, since the right and left pillars 62, the first protruding member 66, and the roof reinforcement 68 constitute a generally annular reinforcing structure V as shown in FIG. 3, the reinforcing structure V bears the collision load so that the deformation of the frame 12 can be effectively suppressed.

Furthermore, in the present embodiment, as shown in FIG. 4, the first protruding member 66 and the second protruding member 72 protrude downward from the lower portion of the vehicle body 60, and the first protruding member 66 is fastened to the right and left first front mount brackets 40. The second protruding member 72 is fastened to the right and left second front mount brackets 42. Thus, the collision load input to the frame 12 is dispersed to the right and left via the first protruding member 66 and the second protruding member 72.

In addition, in the present embodiment, as shown in FIG. 3, the third front mount portions M3 that support the vehicle body 60 are provided forward of the second front mount portions M2 in the vehicle front-rear direction. Similarly, the third rear mount portions M6 that support the vehicle body 60 are provided rearward of the second rear mount portions M5 in the vehicle front-rear direction (see FIG. 1). Thus, a load from the vehicle body 60 in the vertical direction acts on the front rail portions 16 at two locations, namely, the second front mount portions M2 and the third front mount portions M3. As a result, it is possible to effectively suppress the front rail portions 16 from deforming upward at the time of frontal collision of the vehicle 10. Similarly, a load from the vehicle body 60 in the vertical direction acts on the rear rail portions 18 at two locations, namely, the second rear mount portions M5 and the third rear mount portions M6. As a result, it is possible to effectively suppress the rear rail portions 18 from deforming upward at the time of rear-end collision of the vehicle 10.

Further, in the present embodiment, the third front mount portions M3 are located upward of the joint portions J between the first front cross member 24 and the front rail portions 16 in the vehicle up-down direction, as viewed in the vehicle width direction. Thus, compared to a structure in which the third front mount portions M3 and the first front cross member 24 are arranged offset from each other in the vehicle front-rear direction, a large crushing margin of the front rail portions 16 can be secured at the time of frontal collision.

With regard to the above operations, a structure is considered in which the third front mount portions M3 and the first front cross member 24 are arranged offset from each other in the vehicle front-rear direction. In such a structure, when a collision load is input to the front rail portions 16, the third front mount portions M3 (portions to which the third front mount brackets 44 are attached) are not crushed. Also, the joint portions J at which the first front cross member 24 is joined are not crushed. On the other hand, in the present embodiment, at least parts of the third front mount portions M3 are located upward of the joint portions J between the front rail portions 16 and the first front cross member 24 in the vehicle up-down direction, as viewed in the vehicle width direction. Thus, it is possible to secure a larger crushing margin corresponding to the length for which the third front mount portions M3 and the first front cross member 24 overlap in the vehicle front-rear direction as viewed in the vehicle width direction. As a result, the collision energy at the time of frontal collision can be effectively absorbed.

Although the embodiment has been described above, the disclosure can be implemented in various modes without departing from the scope of the disclosure. For example, the vehicle 10 according to the above-described embodiment has a symmetrical structure in the front-rear direction, but the disclosure is not limited to this. That is, the disclosure may be applied to a vehicle that includes only the first front mount portions M1, the second front mount portions M2, and the third front mount portions M3, and does not include the first rear mount portions M4, the second rear mount portions M5, and the third rear mount portions M6. Conversely, the disclosure may be applied to a vehicle that includes only the first rear mount portions M4, the second rear mount portions M5, and the third rear mount portions M6, and does not include the first front mount portions M1, the second front mount portions M2, and the third front mount portions M3.

Further, in the above embodiment, the first front mount brackets 40 are provided on the rear portions 20B of the front connecting rail portions 20 as shown in FIG. 4, but the disclosure is not limited to this. That is, the first front mount brackets 40 only need to be provided at the first front mount portions M1 including the front portions 14A of the center rail portions 14 and the rear portions 20B of the front connecting rail portions 20. For example, the first front mount brackets 40 may be provided on the front portions 14A of the center rail portions 14.

Further, in the above-described embodiment, the second front mount brackets 42 are provided on the front portions 20A of the front connecting rail portions 20, but the disclosure is not limited to this. That is, the second front mount brackets 42 only need to be provided at the second front mount portions M2 including the rear portions 16B of the front rail portions 16 and the front portions 20A of the front connecting rail portions 20. For example, the second front mount brackets 42 may be provided on the rear portions 16B of the front rail portions 16.

Furthermore, in the above-described embodiment, the first front cross member 24 is the radiator support lower member that supports the radiator (not shown) from below, but the disclosure is not limited to this. The first front cross member 24 may be used for other purposes. For example, the first front cross member 24 may be used for supporting other devices such as a power unit and sensors.

What is claimed is:

1. A vehicle lower part structure, comprising:
   a pair of right and left center rail portions disposed at a central part in a front-rear direction of a vehicle and extending in the front-rear direction of the vehicle;
   a pair of right and left front rail portions and a pair of right and left rear rail portions, the front rail portions being disposed forward of the center rail portions in the front-rear direction of the vehicle, the rear rail portions being disposed rearward of the center rail portions in the front-rear direction of the vehicle, and the front rail portions and the rear rail portions each extending in the front-rear direction of the vehicle at a position upward of the center rail portions in an up-down direction of the vehicle;
   a pair of right and left front connecting rail portions and a pair of right and left rear connecting rail portions, the front connecting rail portions connecting the center rail portions and the front rail portions, the rear connecting rail portions connecting the center rail portions and the rear rail portions, and the front connecting rail portions and the rear connecting rail portions being inclined upward in the up-down direction of the vehicle from the center rail portions toward the front rail portions and the rear rail portions, respectively, as viewed in a width direction of the vehicle;
   first mount portions that are provided at at least one of a connecting portion between the center rail portions and the front connecting rail portions and a connecting portion between the center rail portions and the rear connecting rail portions, the first mount portions supporting a vehicle body constituting a cabin; and
   second mount portions that are provided at at least one of a connecting portion between the front rail portions and the front connecting rail portions and a connecting portion between the rear rail portions and the rear connecting rail portions, the second mount portions supporting the vehicle body, wherein
   the first mount portions and the second mount portions are provided at each of a front part and a rear part of the vehicle.

2. The vehicle lower part structure according to claim 1, further comprising:
   a third mount portion that supports the vehicle body and is provided forward, in the front- rear direction of the vehicle, of each of the second mount portions at the front part of the vehicle.

3. The vehicle lower part structure according to claim 2, further comprising:
   a connecting member connecting the pair of right and left front rail portions in the width direction of the vehicle, wherein
   at least a part of the third mount portion is located upward, in the up-down direction of the vehicle, of a joint portion between each of the pair of right and left front rail portions and the connecting member as viewed in the width direction of the vehicle.

4. The vehicle lower part structure according to claim 1, further comprising:
   a third mount portion that supports the vehicle body and is provided rearward, in the front-rear direction of the vehicle, of each of the second mount portions at the rear part of the vehicle.

5. The vehicle lower part structure according to claim 4, further comprising:
   a connecting member connecting the pair of right and left rear rail portions in the width direction of the vehicle, wherein
   at least a part of the third mount portion is located upward, in the up-down direction of the vehicle, of a joint portion between each of the pair of right and left rear rail portions and the connecting member as viewed in the width direction of the vehicle.

6. The vehicle lower part structure according to claim 1, wherein
   each of the pair of right and left front connecting rail portions is a component separate from the pair of right and left center rail portions and the pair of right and left front rail portions, and
   each of the pair of right and left rear connecting rail portions is a component separate from the pair of right and left center rail portions and the pair of right and left rear rail portions.

7. A vehicle lower part structure, comprising:
   a pair of right and left center rail portions disposed at a central part in a front-rear direction of a vehicle and extending in the front-rear direction of the vehicle;
   a pair of right and left front rail portions and a pair of right and left rear rail portions, the front rail portions being disposed forward of the center rail portions in the front-rear direction of the vehicle, the rear rail portions being disposed rearward of the center rail portions in the front-rear direction of the vehicle, and the front rail portions and the rear rail portions each extending in the front-rear direction of the vehicle at a position upward of the center rail portions in an up-down direction of the vehicle;
   a pair of right and left front connecting rail portions and a pair of right and left rear connecting rail portions, the front connecting rail portions connecting the center rail portions and the front rail portions, the rear connecting rail portions connecting the center rail portions and the rear rail portions, and the front connecting rail portions and the rear connecting rail portions being inclined upward in the up-down direction of the vehicle from the center rail portions toward the front rail portions and the rear rail portions, respectively, as viewed in a width direction of the vehicle;
   first mount portions that are provided at at least one of a connecting portion between the center rail portions and the front connecting rail portions and a connecting portion between the center rail portions and the rear connecting rail portions, the first mount portions supporting a vehicle body constituting a cabin; and
   second mount portions that are provided at at least one of a connecting portion between the front rail portions and the front connecting rail portions and a connecting portion between the rear rail portions and the rear connecting rail portions, the second mount portions supporting the vehicle body, wherein
   the first mount portions support lower end portions of pillars extending in the up-down direction of the vehicle at side portions of the vehicle body and constituting a frame.

8. The vehicle lower part structure according to claim 7, wherein
   each of the pair of right and left front connecting rail portions is a component separate from the pair of right and left center rail portions and the pair of right and left front rail portions, and each of the pair of right and left rear connecting rail portions is a component separate from the pair of right and left center rail portions and the pair of right and left rear rail portions.

9. A vehicle lower part structure, comprising:

a pair of right and left center rail portions disposed at a central part in a front-rear direction of a vehicle and extending in the front-rear direction of the vehicle;

a pair of right and left front rail portions and a pair of right and left rear rail portions, the front rail portions being disposed forward of the center rail portions in the front-rear direction of the vehicle, the rear rail portions being disposed rearward of the center rail portions in the front-rear direction of the vehicle, and the front rail portions and the rear rail portions each extending in the front-rear direction of the vehicle at a position upward of the center rail portions in an up-down direction of the vehicle;

a pair of right and left front connecting rail portions and a pair of right and left rear connecting rail portions, the front connecting rail portions connecting the center rail portions and the front rail portions, the rear connecting rail portions connecting the center rail portions and the rear rail portions, and the front connecting rail portions and the rear connecting rail portions being inclined upward in the up-down direction of the vehicle from the center rail portions toward the front rail portions and the rear rail portions, respectively, as viewed in a width direction of the vehicle;

first mount portions that are provided at at least one of a connecting portion between the center rail portions and the front connecting rail portions and a connecting portion between the center rail portions and the rear connecting rail portions, the first mount portions supporting a vehicle body constituting a cabin; and second mount portions that are provided at at least one of a connecting portion between the front rail portions and the front connecting rail portions and a connecting portion between the rear rail portions and the rear connecting rail portions, the second mount portions supporting the vehicle body, wherein:

the first mount portions are each configured to include a first mount bracket to which the vehicle body is fastened; and the second mount portions are each configured to include a second mount bracket to which the vehicle body is fastened.

10. The vehicle lower part structure according to claim 9, wherein:

a first protruding member and a second protruding member are disposed at lower portions of the vehicle body so as to be spaced apart from each other in the front-rear direction of the vehicle, the first protruding member and the second protruding member extending in the width direction of the vehicle and protruding downward in the up-down direction of the vehicle;

the first protruding member is fastened to pairs of right and left first mount brackets; and the second protruding member is fastened to pairs of right and left second mount brackets.

11. The vehicle lower part structure according to claim 9, wherein each of the pair of right and left front connecting rail portions is a component separate from the pair of right and left center rail portions and the pair of right and left front rail portions, and each of the pair of right and left rear connecting rail portions is a component separate from the pair of right and left center rail portions and the pair of right and left rear rail portions.

* * * * *